US010114387B2

(12) United States Patent
Ellec et al.

(10) Patent No.: US 10,114,387 B2
(45) Date of Patent: Oct. 30, 2018

(54) MASS FLOW CONTROLLER WITH NEAR FIELD COMMUNICATION AND/OR USB INTERFACE TO RECEIVE POWER FROM EXTERNAL DEVICE

(71) Applicant: ILLINOIS TOOL WORKS INC., Glenview, IL (US)

(72) Inventors: Christophe Ellec, Corona, CA (US); Berwin Banares, Lake Forest, CA (US)

(73) Assignee: Illinois Tool Works Inc., Glenview, IL (US)

( * ) Notice: Subject to any disclaimer, the term of this patent is extended or adjusted under 35 U.S.C. 154(b) by 324 days.

(21) Appl. No.: 14/772,868

(22) PCT Filed: Mar. 7, 2014

(86) PCT No.: PCT/US2014/021976
§ 371 (c)(1),
(2) Date: Sep. 4, 2015

(87) PCT Pub. No.: WO2014/164336
PCT Pub. Date: Oct. 9, 2014

(65) Prior Publication Data
US 2016/0018829 A1    Jan. 21, 2016

Related U.S. Application Data

(60) Provisional application No. 61/777,224, filed on Mar. 12, 2013.

(51) Int. Cl.
*G05D 7/00*    (2006.01)
*F17D 3/00*    (2006.01)
(Continued)

(52) U.S. Cl.
CPC ........... *G05D 7/0635* (2013.01); *G05B 15/02* (2013.01); *H04W 4/80* (2018.02)

(58) Field of Classification Search
CPC .................................................. G05D 7/0635
(Continued)

(56) References Cited

U.S. PATENT DOCUMENTS 5,062,446 A    11/1991   Anderson
5,080,131 A *  1/1992   Ono ....................... G01F 1/6842
                                                             137/486
(Continued)

FOREIGN PATENT DOCUMENTS

EP    1790898 A1    5/2007
JP    H06-502942 A    3/1994
(Continued)

OTHER PUBLICATIONS

Brooks, Brooks Models SLA7850-SLA7860 Mass Flow Controllers & Meters, Aug. 2009, Brooks Instrument, pp. 56.*
(Continued)

*Primary Examiner* — Suresh Suryawanshi
(74) *Attorney, Agent, or Firm* — McGuireWoods LLP (57) ABSTRACT

The disclosed embodiments include several embodiments of a mass flow controller and methods for configuring a mass flow controller. For example, in one embodiment, the method includes automatically displaying a current configuration parameter, such as, but not limited to, a MacID and/or baud rate, in response to receiving power, from an external device, at a communication interface, such as, but not limited to, a near-field communication interface and/or a universal serial bus communication interface of the mass flow controller. The method adjusts the configuration parameter based on user input and stores the configuration parameter in memory while being powered by the external device.

20 Claims, 4 Drawing Sheets

(51) Int. Cl.
*G01F 1/00* (2006.01)
*G05D 7/06* (2006.01)
*H04W 4/80* (2018.01)
*G05B 15/02* (2006.01)

(58) Field of Classification Search
USPC .......................................................... 700/282
See application file for complete search history.

(56) References Cited

U.S. PATENT DOCUMENTS

| | | | |
|---|---|---|---|
| 6,810,308 B2 | 10/2004 | Shajii et al. | |
| 6,845,659 B2 | 1/2005 | Lull | |
| 7,004,191 B2 | 2/2006 | Shajii et al. | |
| 7,073,392 B2* | 7/2006 | Lull | G01F 1/696 137/488 |
| 7,136,767 B2 | 11/2006 | Shajii et al. | |
| 7,769,493 B2* | 8/2010 | Elshafei | G05D 7/0635 137/486 |
| 7,809,473 B2* | 10/2010 | Shajii | G05D 7/0635 137/14 |
| 7,896,030 B2* | 3/2011 | Shinohara | F16K 27/003 137/884 |
| 8,537,025 B2* | 9/2013 | Le Garrec | G06K 19/07749 235/383 |
| 8,811,897 B2* | 8/2014 | Matsumoto | G06K 19/0707 235/439 |
| 9,146,563 B2* | 9/2015 | Smirnov | G05D 7/0629 |
| 2006/0249507 A1 | 11/2006 | Bohlinger et al. | |
| 2008/0147332 A1* | 6/2008 | Arikara | G01F 15/063 702/23 |
| 2009/0095068 A1 | 4/2009 | Redemann et al. | |
| 2009/0303013 A1 | 12/2009 | Edgerton | |
| 2010/0141465 A1* | 6/2010 | Le Garrec | G06K 19/07749 340/686.6 |
| 2010/0190436 A1 | 7/2010 | Cook et al. | |
| 2011/0275316 A1 | 11/2011 | Suumaeki et al. | |
| 2014/0130878 A1* | 5/2014 | Marinez | F16K 37/005 137/2 |

FOREIGN PATENT DOCUMENTS

| | | |
|---|---|---|
| JP | 2006-083959 A | 3/2006 |
| JP | 2006-519997 A | 8/2006 |
| WO | 2004010234 A2 | 1/2004 |

OTHER PUBLICATIONS

Mohamed, Strengths and Weaknesses of Near Field Communication (NFC) Technology, Global Journal of Computer Science and Technology, vol. 11 Issue 3 Version 1.0 Mar. 2011, pp. 7.*
ISR and WO for PCT/US2014/021976 dated Jul. 3, 2014.
European Office Action dated Feb. 9, 2018; European Application No. 14 714 069.3.

* cited by examiner

MASS FLOW CONTROLLER WITH NEAR FIELD COMMUNICATION AND/OR USB INTERFACE TO RECEIVE POWER FROM EXTERNAL DEVICE

RELATED APPLICATIONS

The present application is a National Phase of International Application Number PCT/US2014/021976 filed Mar. 7, 2014 and claims priority to U.S. Provisional Application No. 61/777,224 filed Feb. Mar. 12, 2013.

BACKGROUND OF THE INVENTION

1. Field of the Invention

The present invention relates generally to the operation of a mass flow controller (MFC).

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. For example, it is to be understood that the term fluid may apply to liquids, gases, vapors, and slurries comprising any combination of matter or substance to which controlled flow may be of interest.

BRIEF DESCRIPTION OF THE DRAWINGS

Illustrative embodiments of the present invention are described in detail below with reference to the attached figures, which are incorporated by reference herein and wherein.

DETAILED DESCRIPTION

Currently, mass flow controllers (MFCs) that have some electrical configuration (e.g., DeviceNet or EtherCAT) typically require Media Access Control Identifier (MacID) and baud rate configuration (individualized for each unit on a tool). This configuration process is currently being done using rotary switches that are customer accessible and require a screwdriver to modify. Using rotary switches to set the MacID is an expensive solution to the problem. In addition, the process requires openings in the MFC enclosure, which translates into cost (extra machining and labor), and source of electrical noise. Further, although using rotary switches to set MacID can be done without applying power, power is eventually needed to verify that the changes were made and took effect correctly.

Additionally, MFCs with electrical configuration typically require custom cables and software to connect to, configure, and collect data from. Further, data collection currently requires a computer to be physically connected to the MFC to perform any real time data collection.

Accordingly, the disclosed inventions seek to provide one more or solutions to the above problems. For instance, in one embodiment, the disclosed inventions include an MFC that enables changing of the MacID and baud rate settings without the use of expensive switches and without requiring power cables. In another embodiment, the disclosed inventions include an MFC that includes a standard Universal Serial Bus (USB) connection that will enable the use of off-the-shelf cables and hubs for manufacturing processes, data exchange, and communication while installed at the customer's site.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
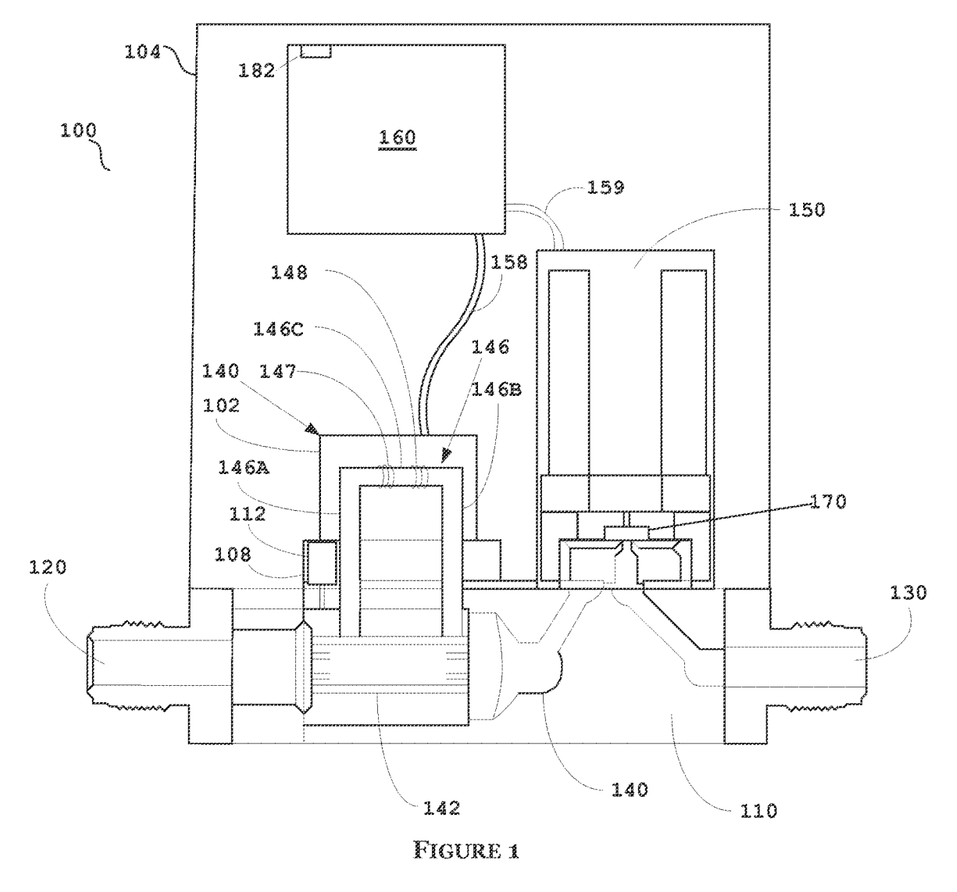
FIG. 1 is a diagram that illustrates components of a mass flow controller in accordance with the disclosed embodiments.

FIG. 1 illustrates components of a mass flow controller 100 in accordance with the disclosed embodiments. In one embodiment, mass flow controller 100 includes a block 110, which is the platform on which the components of the mass flow controller are mounted. The majority of the components of the MFC are integrated within a housing 104. A thermal mass flow meter 140 and a valve assembly 150 are mounted on the block 110 between a fluid inlet 120 and a fluid outlet 130. In other embodiments, the thermal mass flow meter 140 may be bolted directly to the valve assembly 150 without the use of the block 110. The valve assembly 150 includes a control valve 170. In certain embodiments, the control valve 170 may be one of a solenoid valve or a Piezo valve. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

A bypass 142 may then be mounted to the sensor, and the bypass 142 is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass 142 may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure.

Control electronics 160 is used to control the position of the control valve 170 in accordance with a set point indicating the desired mass flow rate, and an electrical flow signal from the mass flow sensor indicative of the actual mass flow rate of the fluid flowing in the sensor conduit. In certain embodiments, traditional feedback control methods such as proportional control, integral control, proportional-integral (PI) control, derivative control, proportional-derivative (PD) control, integral-derivative (ID) control, and pro- portional-integral-derivative (PID) control are then used to control the flow of fluid in the mass flow controller. Other embodiments may employ a model based controller that does not use any PID type control. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the valve assembly 150 to modify the flow. To this end, the controller 160 compares the signal from the mass flow sensor 140 to predetermined values and adjusts the control valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor or a differential pressure type sensor. An advantage of using a Coriolis-based sensor is that it is capable of determining mass flow independent of temperature, flow profile, density, viscosity, and homogeneity. Additionally, differential pressure type sensors are becoming popular for gas control.

Additionally, while the above description of the mass flow controller 100 discloses the use of voltage signals, in certain embodiments, the mass flow controller 100 may include distributed electronics where the signals will be digital commands to and from the sensor and to and from the valve.

As stated above, in accordance with one embodiment, a mass flow controller is disclosed that enables the changing of settings within the MFC without the use of expensive switches and without requiring power cables. For example, in one embodiment, a mass flow controller is modified to include a Near Field Communication (NFC) circuit component 200 such as, but not limited to, the example printed circuit board (PCB) depicted in FIG. 2.

Figure 2:
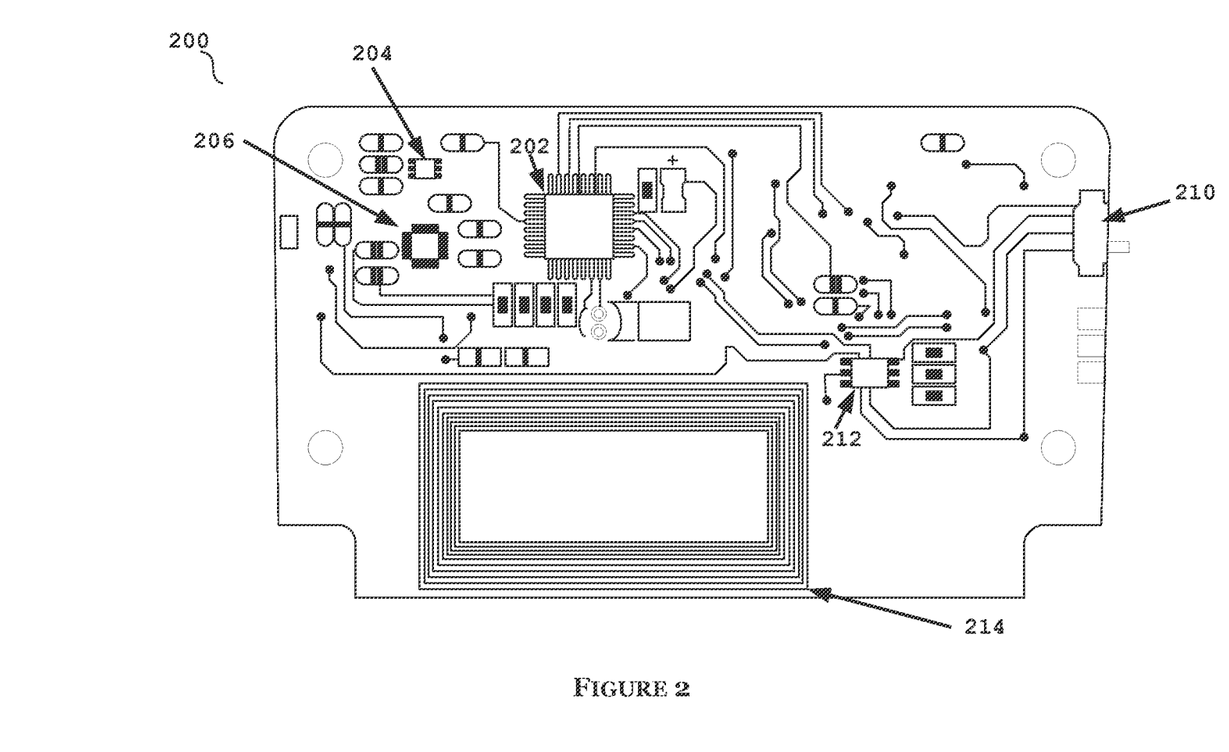
FIG. 2 is a diagram that illustrates an example of a Near Field Communication (NFC) circuit component in accordance with the disclosed embodiments.

NFC is a set of standards for smartphones and similar devices to establish radio communication with each other by touching them together or bringing them into close proximity, usually no more than a few centimeters. NFC standards cover communications protocols and data exchange formats, and are based on existing radio-frequency identification (RFID) standards. Radio-frequency identification is the use of a wireless non-contact system that uses radio-frequency electromagnetic fields to transfer data from a tag attached to an object, for such purposes as, but not limited to, automatic identification and tracking. For instance, in one embodiment, the NFC circuit component 200 includes an antenna 214 for providing a radio-frequency (RF) interface.

In one embodiment, the Near Field Communication (NFC) communication circuit component 200 may also include one or more of a microprocessor 202, a temperature sensor 204, a micro-electromechanical systems (MEMS) component 206. In certain embodiments, the NFC circuit component 200 may be configured in a RFID mode using a RFID communication interface switch 210 for reading and writing to the Electrically Erasable Programmable Read- Only Memory (EEPROM) 212 or other memory components. Alternatively, in some embodiments, the NFC circuit component 200 may be configured to read and write directly to a memory component of the MFC.

In a first embodiment, the NFC circuit component 200 is used a means to provide power to the MFC. In one embodiment, the limited amount of power available is sufficient to power the circuit in the MFC that is responsible for setting the MacID. In this embodiment, the mass flow controller may include a LCD display that displays the MacID of the device, and may also include a set of push buttons used to change the MacID to the desired new value. The disclosed mass flow controller may then communicate with any device having an RFID reader. For example, most modern phones now provide a NFC power source. Also, any RFID wand reader and mouse pad type RFID reader could also be used.

Figure 3:
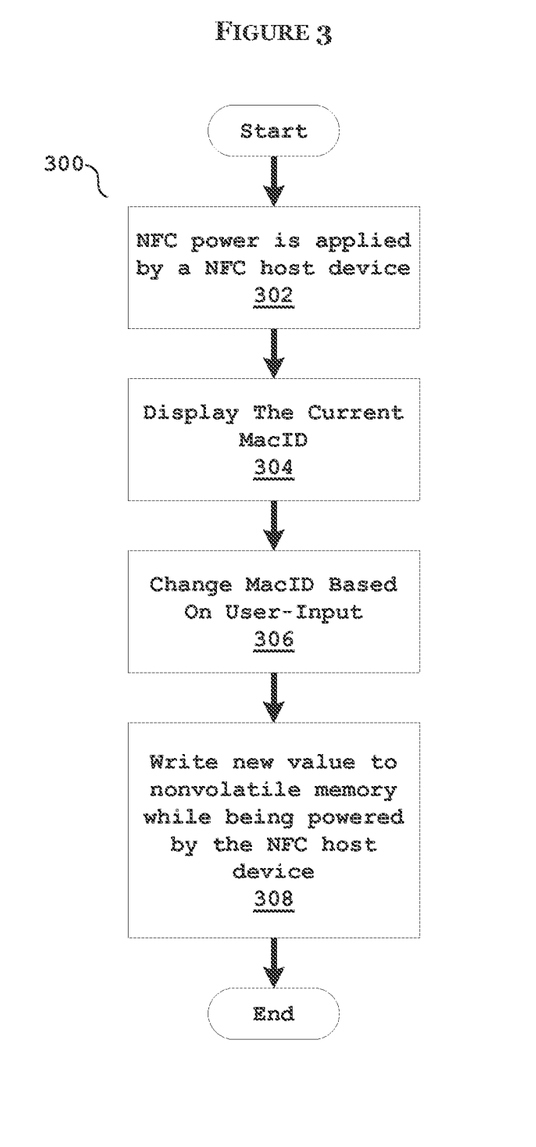
FIG. 3 is a flow chart depicting a process for adjusting the parameters of a mass flow controller in accordance with the disclosed embodiments.

In one embodiment, as depicted in FIG. 3, a mass flow controller is programmed to automatically execute an algorithm 300 when the NFC power is applied (step 302) to automatically display the current MacID or other settings (step 304). The algorithm 300 then adjusts the MacID or other settings based on user input (step 306). For example, in one embodiment, the MacID can be changed accordingly (up or down) using one or more push buttons located on the mass flow controller. In certain embodiments, the MacID may flash or provide some other indication that it is changing. Afterwards, the algorithm 300 writes the new value(s) to nonvolatile memory while being powered by the NFC source (step 308). To simply check on the settings, a NFC host device could simply be positioned next to the MFC and the display would light up and show the current MacID. In certain embodiments, the MacID may be displayed on the host device.

In a second embodiment, the host NFC device could also run an application or software that communicates over the NFC protocol to send new baud rate and MacID configuration settings to the mass flow controller. In this embodiment, physically touching the MFC is not necessary. Security can be handled through encryption. In one embodiment, software running on the RFID reader (or an "app" on a smart phone) may be used to set certain parameters inside the MFC including, but not limited to, the MacID.

Still, in another embodiment, the disclosed inventions include an MFC that includes one or more Universal Serial Bus (USB) connections 182 that will enable the use of off-the-shelf cables and hubs for manufacturing processes. In one embodiment, the USB connection 182 is positioned at the top of the mass flow controller. However, the USB connection 182 may be positioned elsewhere such as, but not limited to, one or more sides of the mass flow controller.

In one embodiment, the USB protocol is used to exchange or retrieve information with the MFC or configure the MFC (e.g., changing the MacID) without requiring the user to power up the MFC. For example, the USB protocol allows for up to 500 mA at 5V, which is enough to power the logic components of the MFC without requiring an external power supply. The USB interface can be used to power the logic functions of the device to enable data exchange, but not the control portion of the device such as the valve or the sensors.

Figure 4:
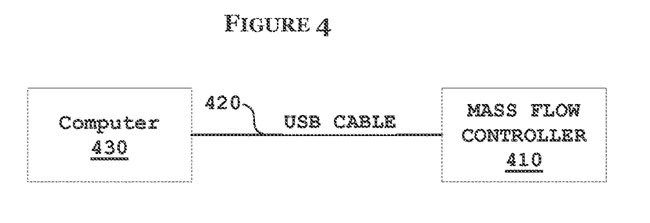
FIG. 4 is a diagram that illustrates an example a communication network using a mass flow controller having a standard Universal Serial Bus (USB) connection in accordance with the disclosed embodiments.

The mass flow controller would execute instructions to use the USB cable to communicate from an external system (such as, but not limited to, a personal computer or laptop) to the MFC for all manufacturing processes, to setup Multiflo, or perform other customer configuration. In one embodiment, as depicted in FIG. 4, the MFC 410 may be connected though the USB cable 420 and appear on the host computer 430 as a COM port that can be accessed using existing software, so no changes are required on the host side. One advantage of the above configuration is that it allows for existing manufacturing process to take advantage of the new technology while being compatible with installed software.

In another embodiment, the MFC appears as a "mass storage device," for example, like a USB storage drive and the host computer could transfer data files to and from the device. Examples of data that can be transferred from the device include, but are not limited to: log files of past events, log files of previous recipes run on the device, and "black box recorder" type information. Examples of data that can be transferred to the device include, but are not limited to: future recipes to run, new calibration tables, new tuning tables, new gas tables for multi gas devices, data streaming logs, factory configuration etc. Firmware and databases can also be stored in protected area for retrieval by field service engineers. Data collection can be setup once or enabled by default and log files are created in the mass storage section of the device.

In another embodiment, the MFC could be powered though a "battery in a USB stick" module to enable settings of parameters as described in the NFC portion. In another embodiment a smart phone, tablet, or other mobile device could be connected to the MFC through the USB port to enable data exchange and device configuration using the mobile device.

Still, in another embodiment, the MFC may act as a host while a standard USB memory stick is plugged into the device. The MFC can then be instructed, through various means, to transfer data to and or from the memory stick as described above already.

Figure 5:
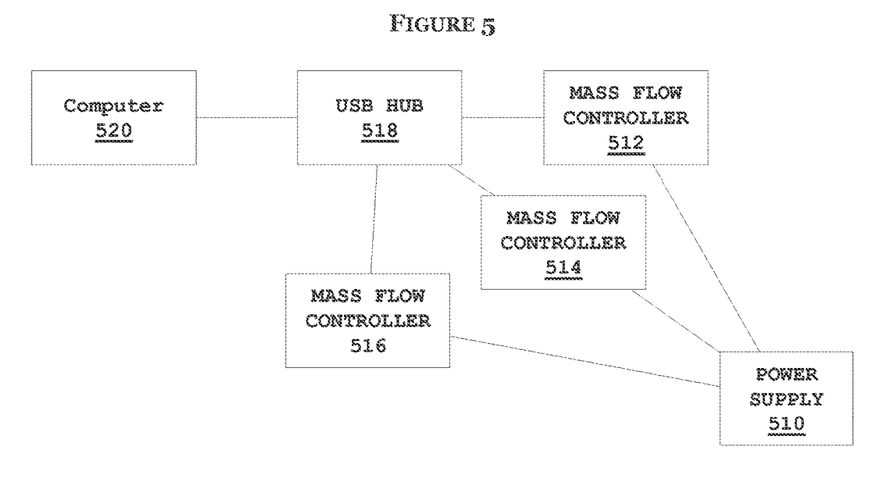
FIG. 5 is a diagram that illustrates an example a communication network with multiple USB configured mass flow controllers in accordance with the disclosed embodiments.

FIG. 5 illustrates an example of a multiple MFCs configuration for manufacturing. Power is provided by a separate power supply 510. In one embodiment, the computer can calibrate or run other processes, simultaneously or one at a time, on multiple mass flow controllers such as, but not limited to, mass flow controllers 512-516. The mass flow controllers 512-516 may be connected directly to a host computer 520 or alternatively, the mass flow controllers 512-516 may be connected to a USB hub 518, which in turn is coupled to the host computer 520 as shown in FIG. 5.

Accordingly, the disclosed inventions provide various embodiments of an MFC. Examples of the disclosed inventions include an MFC that enables changing of the MacID using near field communication. In another embodiment, the disclosed inventions include an MFC that includes a standard USB connection that will enable the use of off the shelf cables and hubs for manufacturing processes. Still, in certain embodiments, the MFC may be configured with both a NFC communication circuit component and a USB communication interface.

While specific details about the above embodiments have been described, the above descriptions are intended merely as example embodiments and are not intended to limit the structure or implementation of the disclosed embodiments.

Those skilled in the art will recognize that the present teachings are amenable to a variety of modifications and/or enhancements. For instance, while the above description specifically describes an MFC, one of ordinary skill in the art would recognize that certain of the disclosed embodiments may also be implemented in a mass flow meter (MFM), pressure gages, pressure controller, variable area meter, pressure based MFC, or other similar measuring device.

While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller comprising:
an inlet for receiving fluid;
a flow path in which the fluid passes through the mass flow controller;
a near-field communication component configured to communicate with an external device and to receive power from the external device to power at least one of a memory, a configuration setting logic component, and a display of the mass flow controller;
a mass flow sensor for providing a signal corresponding to mass flow of the fluid through the flow path;
an valve for regulating a flow of the fluid out of an outlet of the mass flow controller; and
at least one processing component configured to execute instructions to perform operations comprising controlling the valve based on a desired mass flow rate;
wherein the near-field communication component is configured to cause the logic component to automatically execute another set of instructions to perform operations comprising:
adjusting a configuration parameter based on received input.

2. The mass flow controller of claim 1, wherein the logic circuit is further configured to execute instructions to perform operations further comprising:
automatically displaying the current configuration parameter in response to receiving power at NFC communication interface of the mass flow controller from an external device; and
storing the configuration parameter in memory while being powered by the external device.

3. The mass flow controller of claim 2, wherein the configuration parameter is a media access control identifier of the mass flow controller.

4. The mass flow controller of claim 2, wherein the configuration parameter is a baud rate of the mass flow controller.

5. The mass flow controller of claim 2, wherein adjusting the configuration parameter based on user input is performed in response to receiving user input from one or more push buttons located on the mass flow controller.

6. The mass flow controller of claim 2, wherein adjusting the configuration parameter based on user input is performed in response to receiving the configuration parameters from the external device.

7. A mass flow controller comprising:
an inlet for receiving fluid;
a flow path in which the fluid passes through the mass flow controller;
a universal serial bus communication component configured to communicate with an external device and to receive power from the external device to power at least one of a memory, a configuration setting logic component, and a display of the mass flow controller;
a mass flow sensor for providing a signal corresponding to mass flow of the fluid through the flow path;
an valve for regulating a flow of the fluid out of an outlet of the mass flow controller; and
at least one processing component configured to execute instructions to perform operations comprising controlling the valve based on a desired mass flow rate
wherein the universal serial bus communication interface causes the logic component to automatically execute another set of instructions in response to receiving the power from the external device to perform operations comprising:
adjusting a configuration parameter based on received input.

8. The mass flow controller of claim 7, wherein the logic circuit is further configured to execute instructions to perform operations further comprising:
automatically displaying the current configuration parameter in response to receiving power at a USB communication interface of the mass flow controller from an external device; and
storing the configuration parameter in memory while being powered by the external device.

9. The mass flow controller of claim 8, wherein the configuration parameter is a media access control identifier of the mass flow controller.

10. The mass flow controller of claim 8, wherein the configuration parameter is a baud rate of the mass flow controller.

11. A method for configuring a mass flow controller, the method comprising:
receiving power from an external device over a communications interface to power at least one of a memory, a configuration setting logic component, and a display of the mass flow controller;
executing a set of instructions specific to the logic component in response to receiving power from the external device;
automatically displaying, in response to executing, a current configuration parameter;
adjusting the configuration parameter based on user input; and
storing the configuration parameter in memory while being powered by the external device.

12. The method of claim 11, wherein the configuration parameter is a media access control identifier of the mass flow controller.

13. The method of claim 11, wherein the configuration parameter is a baud rate of the mass flow controller.

14. The method of claim 11, wherein the communication interface that provides power to the mass flow controller is a near-field communication interface.

15. The method of claim 11, wherein the communication interface that provides power to the mass flow controller is a universal serial bus communication interface.

16. The method of claim 11, wherein adjusting the configuration parameter based on user input is performed in response to receiving user input from one or more push buttons located on the mass flow controller.

17. The method of claim 11, wherein adjusting the configuration parameter based on user input is performed in response to receiving the configuration parameters from the external device.

18. The mass flow controller of claim 1, wherein the logic compenent is further configured to execute instructions to perform operations further comprising reading the configuration parameter and communicating the configuration parameter to the external device.

19. The mass flow controller of claim 18, wherein the logic component is further configured to execute instructions to perform operations further comprising receiving an adjusted value for the configuration parameter from the external device.

20. The mass flow controller of claim 7, wherein the logic component is further configured to execute instructions to perform operations further comprising:
   reading the configuration parameter;
   communicating the configuration parameter to the external device; and
   setting an adjusted configuration parameter in response to receiving the adjusted configuration parameter from the external device.

\* \* \* \* \*